United States Patent
Elnozahy

(10) Patent No.: US 7,676,795 B2
(45) Date of Patent: Mar. 9, 2010

(54) ERROR DETECTION IN A DATA PROCESSING SYSTEM

(75) Inventor: Elmootazbellah Nabil Elnozahy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 11/034,553

(22) Filed: Jan. 13, 2005

(65) Prior Publication Data

US 2006/0156156 A1 Jul. 13, 2006

(51) Int. Cl.
*G06F 9/44* (2006.01)
*G06F 11/00* (2006.01)

(52) U.S. Cl. .................... 717/128; 714/21; 714/35; 714/38; 714/49

(58) Field of Classification Search .................. 714/21, 714/35, 38, 49; 717/128
See application file for complete search history.

(56) References Cited

U.S. PATENT DOCUMENTS

| | | | | |
|---|---|---|---|---|
| 5,321,698 A | * | 6/1994 | Nguyen et al. ............. | 714/17 |
| 6,021,272 A | * | 2/2000 | Cahill et al. ............. | 717/147 |
| 6,161,219 A | * | 12/2000 | Ramkumar et al. ......... | 717/130 |
| 6,470,493 B1 | * | 10/2002 | Smith et al. ............. | 717/130 |
| 6,892,379 B2 | * | 5/2005 | Huang .................. | 717/140 |
| 2006/0190930 A1 | * | 8/2006 | Hecht et al. ............. | 717/128 |

FOREIGN PATENT DOCUMENTS

JP 03266037 A * 11/1991

* cited by examiner

*Primary Examiner*—James Rutten
(74) *Attorney, Agent, or Firm*—Dillon & Yudell LLP

(57) ABSTRACT

A compiler for incorporating error detection into executable code generates conventional assembler language object code from a source code file. The compiler identifies an error detection segment (EDS) in the assembler code, where the EDS includes a subset of basic blocks in the assembler code. The compiler also identifies register and memory references in the EDS and inserts a set of instructions into the EDS. The inserted instructions record an entry state and an exit state of the referenced registers and memory locations. The state information is stored in a checkpoint portion of system memory. The compiler may generate shadow EDS code including instructions mirroring the instructions in the main EDS and verifying instructions that compare results produced by the mirroring instructions with results produced by the main EDS. The shadow EDS initiates an error recovery process if results produced by the shadow EDS and the main EDS differ.

18 Claims, 6 Drawing Sheets

```
Const n=100;
double A[n], B[n];
int i=0, C;
double c=1.8472;
double s=0.0;
for (i=0; i<n; i++)
    A[i]=A[i]+c*B[i];
for (i=0; i<n; i++ )
    s=s+A[i]'
if (s<1.0)
    left(s);
else;
    .
    .
    .
```

400

```
(702)STO    r31,   CHKPNT_INDEX;
(703)STU    r0,    (r31);
(704)STU    f1,    (r31);
------------------------B3---------------------------------
L2:    xor    r1, r1, r1;
       ldi    r2, A;
------------------------B4---------------------------------
L3:    cmp    r0, r1;
(705)BGT     L3.5              ;replaces ble L4
(706)STU     f1,    (r31);record final value of f1
(707)STU     r1,    (r31);record final value of r1
(711)STU     r2,    [r31]
(708)JMP L4;
------------------------B5---------------------------------
L3.5:
(709)  LD f2,   [r2]
(710)  STU f2,  [r31]
       faddx f1, f1, (r2)
       addi  r1, 1
       jmp   L3
```

```
(803)LD     r31,   CHKPNT_INDEX;
(804)LDU    r0,    (r31);
(805)LDU    f1,    (r31);
------------------------B3---------------------------------
L2     xor    r1, r1, r1
       ldi    r2, A
------------------------B4---------------------------------
L3     cmp    r0, r1
(806)ble     DONE;
------------------------B5---------------------------------
(807)faddx   f1, f1,  (r31)
(808)addi    r2, 8
     addi    r1, 1
     jmp     L3
DONE:
(809)CMPU    f1,  [r31]
(810)BNE ERROR;
(811)CMPU    r1,  [r31]
(812)BNE ERROR;
(813)CMPU    r2,  [r31]
(814)BNE ERROR;
       END      ;successful confirmation
```

800

*Fig. 8*

ERROR DETECTION IN A DATA PROCESSING SYSTEM

The invention was made with Government support under contract NBCH30390000. THE GOVERNMENT HAS CERTAIN RIGHTS IN THIS INVENTION.

BACKGROUND

1. Field of the Present Invention

The invention is in the field of data processing systems and, more particularly, error detection in data processing systems.

2. History of Related Art

Computer systems represent information in bi-state transistors that can assume the logical values of "1" or "0". These logical values are implemented by electrical signals, where a certain voltage level is assigned to represent a value of "1", and a second level, sufficiently different from the first, is assigned to represent a value of "0". Computer systems are susceptible to a type of error called "soft" errors that occur while the system is in operation. These errors result from electrical noise, cosmic rays, thermal effects, and other factors that may alter an electrical signal that is stored in a transistor. For example, cosmic alpha particles can hit a transistor and change the value of the electrical signal stored in it, such that the logical value stored in the transistor can be altered from "1" to "0" or vice versa.

The effect of soft errors is transient—they do not cause any permanent damage to the machine hardware. However, soft errors corrupt the values stored in transistors used in the computation, and thus the machine may produce incorrect results for the programs that were running when the soft error occurred. Computer designers have recognized these problems since the early days of computing and invented several mechanisms of redundancy to overcome them. Three notable techniques are Error Checking and Correction (ECC) codes, hardware system redundancy, and circuit-level testing and redundancy. ECC codes are used in substantially every computer to detect and possibly recover from the effects of soft errors on the values stored in main memory and machine registers. Depending on the code, one can detect one bit errors, two-bit errors, etc. Moreover, some codes can be used to undo or correct the effects of soft errors when they alter the values stored in main memory or machine register. ECC codes are useful in guarding data that is being stored in main memory or machine registers, and can also be used to guard data while it is being transferred (e.g., over a data bus). ECC codes, however, cannot be used in a straightforward manner in protecting against soft errors that may affect circuit logic, such as the Arithmetic and Logic Unit (ALU), the Branch Unit (BU), etc. For these components the hardware system redundancy and circuit-level testing and redundancy techniques are more effective.

Hardware-level redundancy can guard against the effects of soft errors and other types of failures as well. Systems and subsystems are replicated to detect and possibly recover from errors. This technique depends on the reasonable assumption that errors will occur differently in different replicas. The degree of replication can vary. For a degree of replication of 2, one can detect the effects of soft errors if they alter the results of computation in the replica in which the error occurs. This can be done by simply comparing the output of both replicas and declaring an error if the results do not match. One can increase the degree of replication to 3, in which case the "correct" result will be determined by voting. Assuming that one error occurs, it will drive one of the 3 replicas to produce an incorrect output that is different from the correct outputs that are generating by the two other replicas. Thus, a 2-out-of-3 voting can determine the correct input. Unfortunately, hardware redundancy requires deterministic execution by the application, which is not always feasible for modern, multi-threaded applications that use a thread library such as POSIX Threads (pthread) or applications written in the Java® programming language developed by Sun Microsystems.

Circuit-level testing and redundancy are used to guard against the effects of soft errors as they relate to logical circuits that are used to compute rather than store information. For example, logical AND or OR gates can be affected by soft errors and produce erroneous results. Circuit-level testing and redundancy can guard against these errors by several techniques, all of which fundamentally depend on recomputing the values on the same circuit or similar circuit to produce the results at different times or places. The idea is that a transient error would affect the results in one of the two computations, and thus by comparing the results of the two computations one can detect the effect of the error if a discrepancy exists. This is similar to the system-level replication, except that it is done at the circuit level. As a result, the detection is done within the time span of executing a single instruction. This method is popular as it masks the effects of errors and simplifies the design of the upper system hardware and software layers.

The existing approaches have several shortcomings including cost, inefficiency, and rigidity. With respect to cost, adding redundancy at the hardware level or through system-level replication increases the cost of the design, test, manufacture, and deployment. Cost escalates because of the additional components that are needed to execute the circuit self-test, comparisons, and recomputations. These extra components also reduce the yield that we receive on semiconductor chip fabrication, and thus increase cost further.

Regarding the inefficiency of existing methods, the additional hardware and built-in tests reduce the speed of the machine at the lowest level, forcing circuit designers to use slower components and architectures. Existing methods also fail to exploit new features that can be used to implement redundancy at higher levels, such as simultaneous multi-threading (SMT) and multi-core chip design at the hardware level. It is desirable therefore if more efficient error detection and recovery techniques be implemented at a higher level and reduce the implementation overhead at the hardware level.

With respect to the rigidity of existing approaches, conventional error detection techniques do not generally reflect the actual deployment environment. For instance, the requirement of deterministic execution is necessary for system-level redundancy, which is very difficult to ascertain in real systems. These methods also fail to recognize that errors can occur at different rates in different environments, and that the importance of reliability in an application depends on its criticality. It is recognized that soft errors, for instance, occur more frequently at high altitudes than at sea level. Additionally, one would assume that it is more important to secure mission-critical applications than to secure entertainment programs against soft errors. Thus, it would be desirable if error detection and recovery can be adapted to offer a tradeoff in performance and cost versus the degree of error coverage and recovery that would be desired.

SUMMARY OF THE INVENTION

The objectives identified above are addressed by a software-based compiler and a corresponding method for compiling source code to incorporate error detection functionality into the resulting object code. Initially, the compiler generates conventional assembler language object code (referred as the original assembler code or original object code) from the source code. The original assembler code is comprised of a plurality of basic blocks where a basic block is a block of instructions that always execute sequentially (i.e., no control flow instructions in the block).

The compiler identifies an error detection segment (EDS), also referred to as the main EDS, in the original assembler code where the EDS is comprised of a contiguous subset of the basic blocks in the original object code. The compiler then identifies registers and memory references in the EDS and inserts a set of instructions into the EDS.

The inserted instructions, sometimes referred to as state recording instructions, record the input and output values read or written by the thread while running in the main EDS, respectively. These values are typically read or written in processor registers and memory locations. The input values are sometimes referred to herein as the entry state of a thread while the output value are sometimes referred to as the exit state. The entry state of a referenced register or memory location includes the value of the register or memory location that was current at the beginning of the EDS. Similarly, the exit state of a referenced register or memory location includes the value of the register or memory location that was current at the end of the EDS. The additional instructions record the input and output values in an EDS in a dedicated portion of system memory referred to herein as the checkpoint.

Recording the input values or entry state enables a subsequently executing piece of code (referred to as a shadow EDS) to reread the values that were consumed by the main EDS, and thus recompute the values that were computed by the main EDS. Recording the output values or exit state enables the shadow EDS to compare its results to the results produced by the main EDS. The instructions in the shadow EDS are functionally equivalent to the original object code in the main EDS. Thus, the compiler generates code capable of: checking whether the main EDS was computed without errors by recreating the entry state or initial conditions seen by the main EDS; executing instructions equivalent to instructions in the main EDS; and comparing the results with results generated by the EDS. In this manner, the compiler incorporates error detection functionality into the object code.

The referenced registers identified by the compiler may include any register that is read by an instruction in the EDS, in which case the compiler inserts an instruction to store the entry value of the referenced register. The referenced registers identified by the compiler may also include any register that is written (modified) by an instruction in the EDS, in which case the compiler inserts an instruction to store an exit value of the referenced register. The compiler may also insert instructions to store other information indicative of the environmental state associated with the EDS executes. This additional state information could include, for example, the main EDS identifier.

In addition to inserting state recording instructions into the main EDS, the compiler generates shadow EDS code. The shadow EDS includes (1) instructions that are functionally equivalent to (mirror) the original assembler code instructions in the main EDS and (2) verification instructions that compare results produced by the shadow EDS with results produced by the main EDS, which are stored in the checkpoint as part of the recorded state. The shadow EDS terminates if the results produced by the shadow EDS match the results recorded in the main checkpoint. The shadow EDS initiates an error recovery process if the results produced by the shadow EDS differ from results produced by the main EDS and stored in the checkpoint.

The adaptability of the method comes from the flexibility in deciding the error detection coverage. One can get full coverage by ensuring that each control path in the program is fully covered by at least one main EDS. Alternatively, one can have a probabilistic detection method by fully covering only some of the plausible control paths in the program by EDSs. Yet another degree of flexibility allows one to cover only parts of some of the plausible control paths. Thus, the method allows one to trade the quality of the coverage for lower overhead and vice versa.

BRIEF DESCRIPTION OF THE DRAWINGS

Other objects and advantages of the invention will become apparent upon reading the following detailed description and upon reference to the accompanying drawings in which:

FIG. 7 illustrates an exemplary modified EDS according to an embodiment of the present invention; and FIG. 8 illustrates an exemplary shadow EDS according to an embodiment of the present invention.

Figures 1, 4:
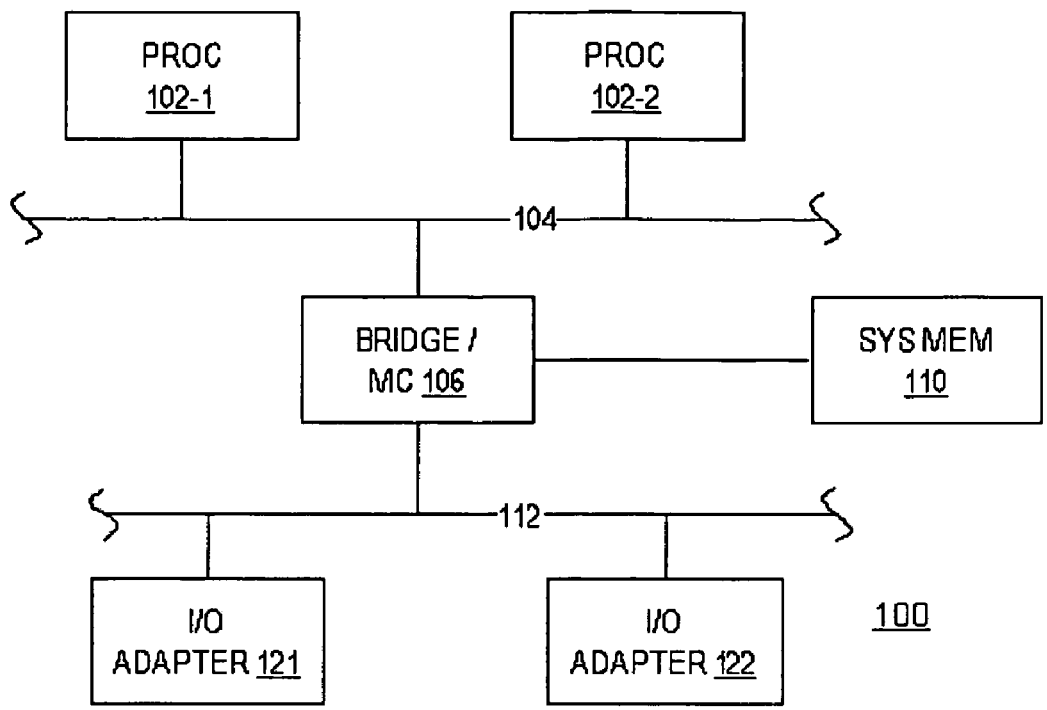
FIG. 1 is a block diagram of a data processing system that is configured to implement an embodiment of the present invention.
FIG. 4 is an exemplary source code file suitable for use in conjunction with the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Before describing additional details of the present invention, selected elements of a data processing system on which the invention may be implemented or executed are described. Referring now to FIG. 1, selected elements of a data processing system 100 including one or more general purpose processors 102-1 and 102-2 (generically or collectively referred to herein as processor(s) 102) are presented. The number of processors 102 is an implementation detail and other systems may include more or fewer processors 102.

Processors 102 are connected to a bus referred to herein as host bus 104. Processors 102 may be compatible with commercially distributed processors including, as examples, the PowerPC® family of processors from IBM Corporation. A bus bridge/memory controller unit 106 provides an interface between processors 102 and a system memory 110. In addition, unit 106 provides an interface between host bus 104 and a peripheral bus 112. Peripheral bus 112 is preferably compliant with an industry standard peripheral bus such as the PCI (Peripheral Components Interface) or the PCI-X busses.

Although FIG. 1 depicts a single peripheral bus 112, those familiar with microprocessor-based system design will appreciate that bus 112 may include one or more subordinate bus bridges that provide any number of peripheral busses.

System 100 as depicted in FIG. 1 includes one or more I/O adapters 121 and 122. I/O adapters 121 and 122 provide I/O functionality to system 100. Adapters 121 and 122 may include, as examples, disc controllers, video adapters, network communication adapters, and so forth. In addition, depending upon the application and implementation of system 100, the I/O adapters represented by reference numerals 121 and 122 may include adapters for a keyboard, mouse, or other suitable input device.

Portions of the present invention may be implemented as a set or sequence of computer executable instructions (e.g., instructions executable by processor(s) 102 of system 100). In such embodiments, the instructions are stored on a computer readable medium. The medium may be a persistent or nonvolatile medium such as a hard disk, floppy diskette, optical diskette, flash memory device, and so forth. During times when a processor is executing the instructions (or a portion thereof), the instructions may be stored in a volatile medium such as system memory 110 or cache memory (not depicted) of processors 102. Software embodiments of the invention may be illustrated in this disclosure by flow diagrams representing a computer aided process or method that occurs when a data processing system such as system 100 executes the software.

Figure 2:
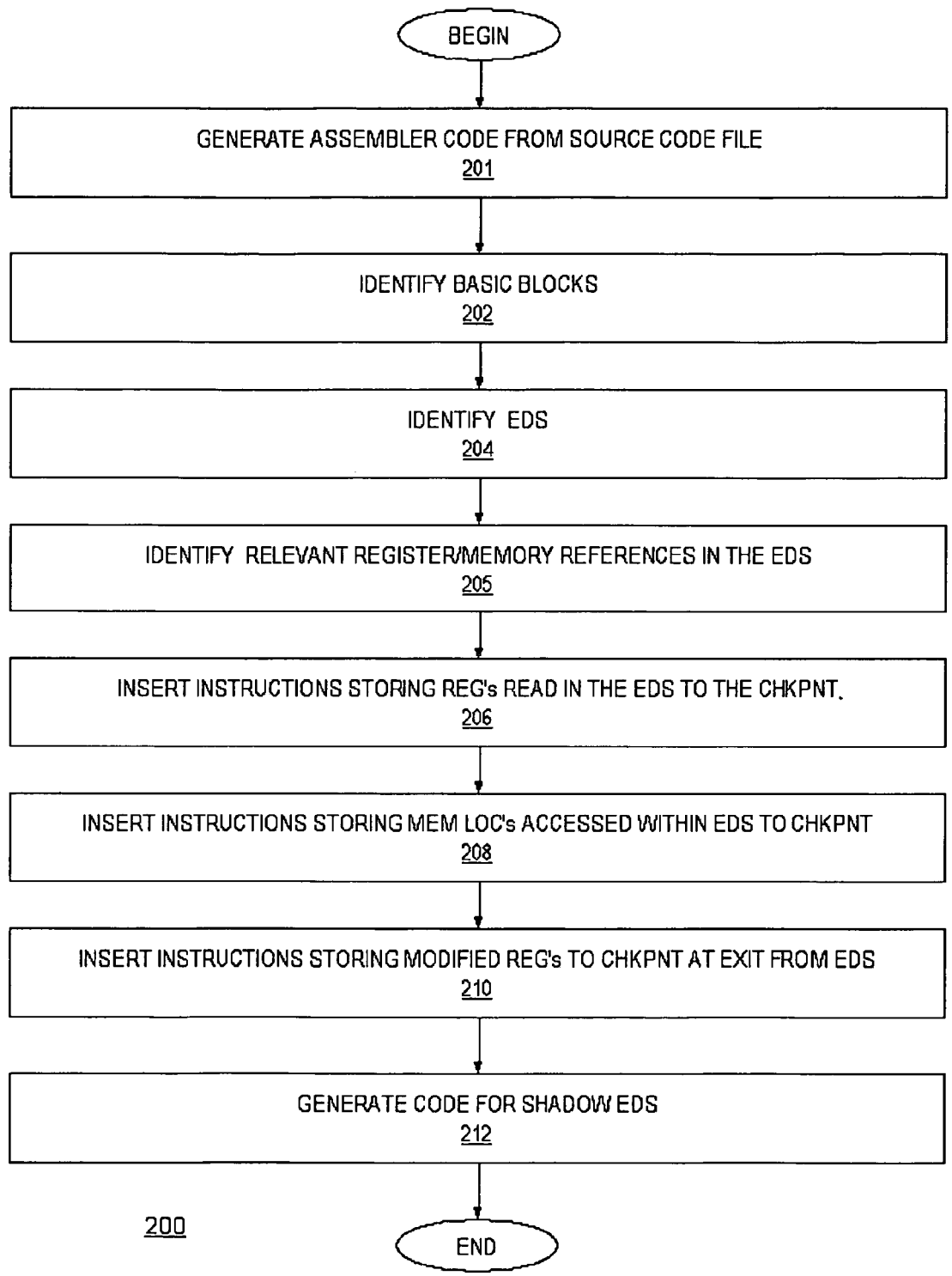
FIG. 2 is a flow diagram representing compiler code according to one embodiment of the invention.

Referring now to FIG. 2, a flow diagram representative of a method and computer code 200 for compiling source code according to one embodiment of the invention is depicted. Computer code 200 (also referred to herein as compiler 200) encompasses incorporating error detection functionality into conventionally compiled object code. Initially, compiler 200 conventionally generates (block 201) assembler code or object code from a source code file. At this point in the process, the assembler code is referred to as the original assembler code or the original object code. The original assembler code is simply the assembly language equivalent of instructions in the source code file. As such, the original assembler code does not include any error detection functionality that is not present in the source code file.

Compiler 200 then identifies (block 202) basic blocks in the assembler code. A basic block is a segment of code that does not include any control flow instructions (e.g., branch instructions). Under this definition, a basic block of code always executes sequentially. Whereas, in a segment of code that includes a branch instruction, program flow may vary depending upon the values of the branch instruction operands.

Compiler 200 as depicted in FIG. 2, then identifies (block 204) an error detection segment (EDS) within the assembler code. An EDS, for purposes of this disclosure, is a collection of basic blocks wherein there is a single entry point or control flow path into the EDS and one or more exit points or control flow paths from the EDS. When a thread of program control starts at the entry of an EDS, it executes within the basic block of the EDS and remains within the EDS until it exits through one of the exit points. Note that Compiler 200 can identify an EDS as small as one basic block, although it is desirable to combine several basic blocks into one EDS for performance reasons. Also, Compiler 200 can identify overlapping EDSs that have one or a plurality of basic blocks in common. Compiler 200 is based on the concept of an EDS because the control flow consistency of basic blocks is desirable in the context of the present invention. Specifically, because the present invention identifies soft errors by executing the same piece of code multiple times and comparing the results of each execution, code segments having no control flow instructions simplify the process by eliminating control flow dependencies as a source of variation between multiple executions of the same code segment.

Compiler 200 enumerates all plausible control flow paths within the program in step 204. Based on some desired coverage degree, compiler 200 decides which of these control flow paths are to be covered with EDSs, and which of the covered control flow paths need be covered fully or partially using EDSs. The compiler can use different heuristics to decide on the number of EDSs depending on a tradeoff between error detection coverage and performance overhead. The more paths covered the better the error detection will be, at the expense of more processing and storage overhead. Additionally, compiler 200 decides the number of basic blocks that comprise an EDS based on a tradeoff between error detection latency and performance overhead. Longer EDSs (an EDS with several basic blocks) reduce the performance overhead by reducing the number of checkpoints. However, a longer EDS will take longer time to compute and thus an error may go unnoticed for a longer period of time.

An EDS is identified by the address of its entry point. For each EDS identified in step 204, compiler 200 examines the instructions in the EDS to determine the relevant register and memory references within the EDS. As a sequence of computer code, the outcome of execution within an EDS may be characterized by the instructions within the EDS and the values of registers and memory locations read and written (referenced) within the EDS. Identifying relevant input values in register and memory that the thread references enables compiler 200 to insert code into the EDS that captures the input variables that were consumed within the EDS. Similarly, identifying output values in registers and memory that the thread writes enables compiler 200 to insert code into the EDS that records these output values and exit state (the state when the EDS ends). Preserving the input and output values the EDS facilitates subsequent efforts to recreate the execution of the EDS as a means of verifying the results produced by the EDS. Compiler 200 identifies references that are relevant in the sense that not all reference are considered to be equally significant for purposes of error detection and compiler 200 may elect not to record the state of all references. For instance, values that are produced by the EDS and subsequently read need not be recorded as input values, since these will be reproduced during the re-execution of the thread during error detection. Similarly, values that are produced by the EDS and subsequently overwritten within the EDS need not be recorded. These values will be reproduced during re-execution. Therefore, the input values recorded by the EDS are those of register and memory locations that were computed outside the EDS (before entering the EDS) and read within the EDS. Similarly, the output values recorded by the EDS are those of register and memory locations that will be available to other parts of the code when the thread of control exits the EDS. These optimizations considerably reduce the amount of data that must be stored to enable re-execution of an EDS. Additionally, these optimizations will tolerate soft errors that do not cause an effect on the output of the computation. For instance, if a memory location is corrupted by a soft error yet will not be read subsequently, the method avoids the unnecessary flagging of such an error. The computation remains safe because the final output is not affected by this error. This is a considerable advantage of the method over prior art.

Having identified an EDS and relevant references in the EDS, compiler 200 then modifies (blocks 206 through 210) the EDS by inserting into the EDS instructions that will store a run-time state associated with the EDS. The run-time EDS state includes values in registers and memory locations that are read by instructions within the EDS. The instructions inserted by compiler 200 store values of selected registers and memory locations to a predetermined and preferably thread-specific portion of memory. The portion of memory in which compiler 200 stores the register/memory state associated with an EDS is referred to in this disclosure as a checkpoint.

As depicted in FIG. 2, compiler 200 inserts (block 206) into the EDS instructions that store to memory the values of registers that are read by the EDS as explained above. The values of these relevant registers and memory locations refer to the values stored in these registers when instructions in the EDS read them. Thus, if an EDS includes instructions that read the values of registers r0 and r1, compiler 200 may insert two store instructions, to store r0 and r1 to the checkpoint.

The depicted implementation of compiler 200 also modifies the assembler code by inserting (block 208) instructions that record relevant memory references that occur within the EDS. More specifically, compiler 200 may insert into the EDS instructions that store into the checkpoint all memory values that are read within the checkpoint as well as storing all memory values that were written and their addresses.

To manage the checkpoint area, compiler 200 sets aside one register to point to the checkpoint area. This register is used throughout the context of a single thread to point to the per-thread checkpoint area. For example, the PowerPC processor has 32 general purpose register, and thus compiler 200 can use one of these registers for that purpose, leaving 31 registers to the application. During the recording of input values (whether from register or memory), the register pointing to the checkpoint area is incremented whenever a value is stored in the checkpoint. This can be done using a single instruction on most processors, such as the STU instruction in the PowerPC processor. Thus, for example, if an EDS includes an instruction LD r0, [r2] (load r0 with the contents of the memory location pointed to by register r2), and assuming that register r31 is set aside to point to the checkpoint area, then compiler 200 may insert instructions storing, to the checkpoint, the value of memory location corresponding to [r2]. The modified code for the LD r0, [r2] instruction might include, as an example:

| | |
|---|---|
| LD r0, [r2] | ;original load instruction |
| STU r0, [r31] | ;inserted instruction to store the value of r0 into the ;checkpoint and increment r31 to point to the next ;location in the checkpoint |

This sequence, in addition to loading r0 with the value in memory location pointed out by r2 (as required by the source code), stores the content associated with that memory location to the checkpoint.

In addition, the depicted compiler 200 inserts instructions storing (block 210) to the checkpoint the output values of any or all registers or memory locations that were modified by instructions in the EDS. For example, if the value of r0 is stored in the memory location pointed out by r2, then compiler 200 will add instructions that record the values and the addresses of the output as in the following sample code:

| | |
|---|---|
| STO r0, [r2] | ;original instruction |
| STU r2, [r31] | ;inserted instruction to store the address of the ;output value into checkpoint, and advance r31 |
| STU r0, [r31] | ;inserted instruction to store the output value into ;checkpoint and advance r31 |

These examples show the crux of the recording method according to a preferred embodiment of this invention on a Reduced Instruction Set Processor (RISC) like the PowerPC processor. For architectures where the number of available registers is small, a pointer to the checkpointing area can be stored in main memory and used in a straightforward manner in the same spirit of the aforementioned example.

Compiler 200 may optimize the storage of registers and memory values to the checkpoint by recording the entry values and exit values of only selected register and memory references. As an example, compiler 200 may determine that a register or memory reference within a particular EDS is either overwritten within the EDS or is not used externally to the EDS. In such cases, compiler 200 might not insert an instruction to record the state of the corresponding register or memory references. In addition, compiler 200 may insert into the EDS additional instructions that record additional information in the checkpoint including, as example, the EDS identifier (the entry address to the EDS) and a commit record at the exit of the EDS.

In blocks 206 through 210 of FIG. 2, compiler 200 modifies the original EDS to include instructions that, when executed at run time, record the register and memory state associated with an EDS in the checkpoint. When processor 102 is running a thread that enters the modified EDS, processor 102 will execute the inserted instructions and thereby save the input and output state to the checkpoint.

Soft error detection is then achieved according to the present invention by later executing the EDS instructions a second time using a shadow thread, which may be executed independently of the thread in which the original EDS (referred to herein as the main EDS) was executed. Compiler 200 according to the embodiment depicted in FIG. 2 is configured to generate (block 212) shadow EDS code. The shadow EDS code may be scheduled to execute any time after the main EDS completes. The shadow thread may execute on the same hardware thread that was used for the main EDS execution. Alternatively, it can execute on a different hardware thread on the same core that was used to run the main EDS. Other alternatives include running the shadow thread on a different core within the chip that was used to run the main EDS, or even on a different chip or system. This flexibility allows different degrees of fault coverage and detection.

The compiler derives the shadow EDS from the main EDS. The shadow EDS contains an instruction stream that recomputes the same values of the main EDS, but unlike the main EDS, however, the shadow EDS does not retrieve relevant references from or write them to the registers or main memory directly. Instead, the shadow EDS retrieves relevant register and memory references from the checkpoint created by the main thread. For example, if the main EDS contains the following instructions:

| | | |
|---|---|---|
| LD | r0,[r2] | ;original instruction |
| STU | r0,[r31] | ;write value in checkpoint, increment r31 |
| LD | r1,[r3] | ;original instruction |
| STU | r1,[r31] | ;write value in checkpoint, increment r31 | the corresponding code in the shadow EDS will be:

```
LDU  r0,[r31]   ;read value from checkpoint, increment r31
LDU  r1,[31]    ;read value from checkpoint, increment r31
```

The LDU instruction is a load instruction that increments the index register that points to the checkpoint, similar to STU in the previous example. Note that because the checkpoint is written sequentially, we can replay the values from it without having to worry about the original source. In other words, since the checkpoint is written as a log, retrieving the values stored in the log can be done by reading it in sequence as in established art.

The values computed by the shadow EDS are compared with the values in the checkpoint, and if there is a discrepancy, an error is detected. For example, if the main EDS contained the following instruction:

```
STO r0, [r2]    ;original instruction
STU r2, [r31]   ;inserted instruction to store the address of the
                ;output value into checkpoint, and advance r31
STU r0, [r31]   ;inserted instruction to store the output value into
                ;checkpoint and advance r31
``` then the shadow EDS contains the following instructions

```
CMPU r2, [r31]  ;check the address in r2 against value in
                ;checkpoint, increment r31
BNZ, error      ;branch to error detection if addresses mismatch
CMPU r0, [r31]  ;check the value in r0 against value in checkpoint,
                ;increment r31
BNZ error       ;branch to error detection if values mismatch
```

Furthermore, if the output value is to a memory location that is going to be reread in the shadow EDS, then compiler 200 generates instructions to store such values into a shadow checkpoint (that is different than the main checkpoint). The input values will be re-read from the shadow checkpoint during the execution of the shadow EDS. The shadow checkpoint is not needed after the shadow EDS finishes execution.

Figure 3:
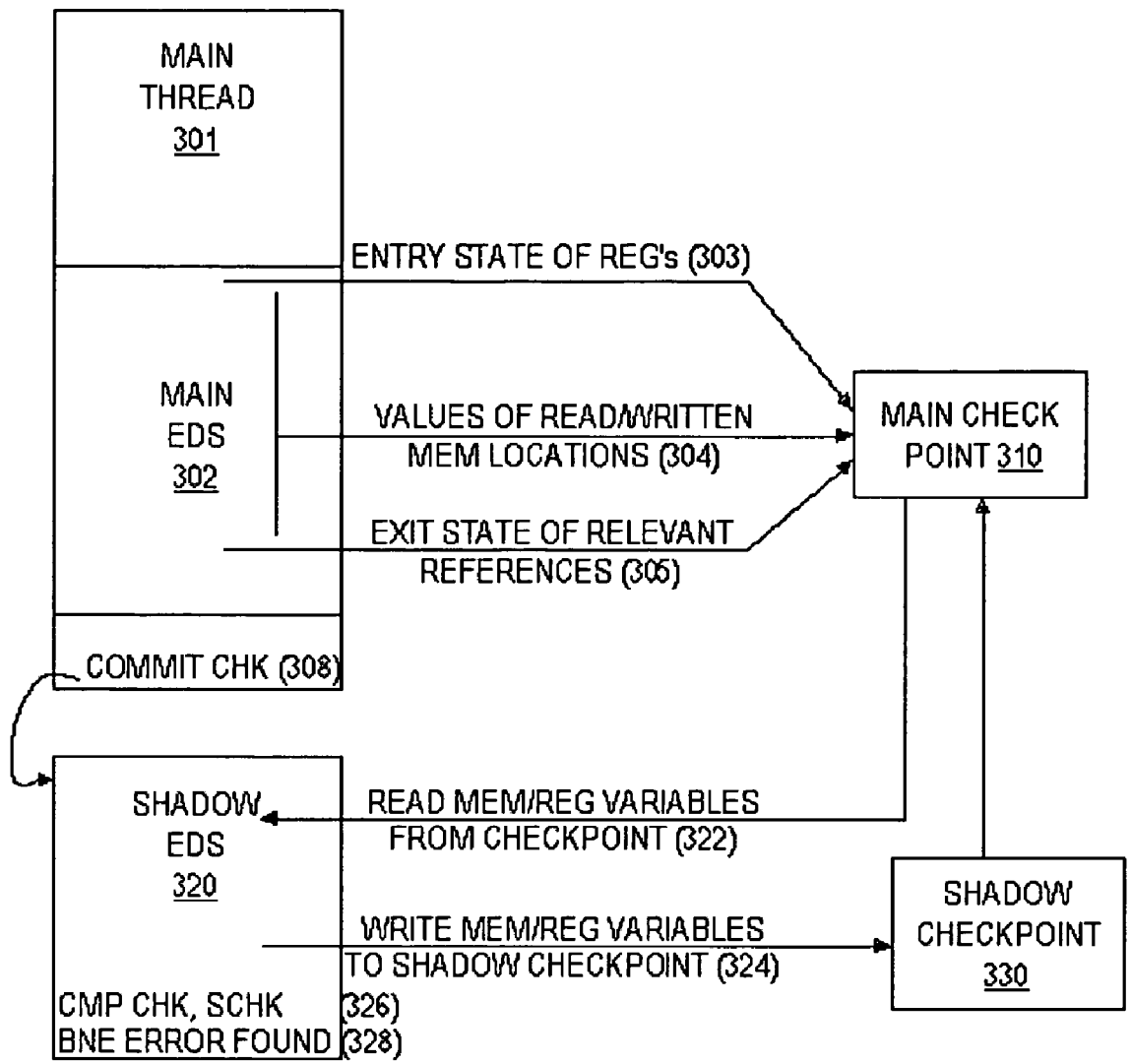
FIG. 3 is a conceptual depiction of compiler-provided error detection functionality incorporated into executable code according to an embodiment of the present invention.

Referring now to FIG. 3, a conceptual illustration of the execution of a main thread 301 compiled by compiler 200 of FIG. 2 is shown. In the depicted illustration, a main thread 301 runs in the context of a main EDS 302. Compiler 200 has inserted into main EDS 302 instructions (conceptually represented by reference numeral 303) for recording the input values of relevant registers in a main checkpoint 310. In addition, compiler 200 has inserted instructions (304) recording the input values of relevant memory references into main checkpoint 310. In addition, compiler 200 has inserted instructions (305) for storing the exit values of relevant registers and memory locations modified by the main EDS 302. When a processor executes main EDS 302, including the inserted instructions 303, 304, and 305, the main checkpoint 310 is said to be "committed" (block 308) in the sense that it contains sufficient state information to do at least two things (1) recreate the input values of the relevant register and memory references and (2) verify the output values of the relevant references (i.e., verify the results produced by the main EDS).

After main EDS 302 commits checkpoint 310, an operating system or runtime system (not depicted) of system 100 schedules the shadow EDS (identified in FIG. 3 by reference numeral 320) for execution. Shadow EDS 320 may be executed as part of a thread that is separate and independent of main thread 301 and main EDS 302. When shadow EDS 320 executes, it retrieves relevant memory and register values from main checkpoint 310. Shadow EDS 320 then executes instructions that are functionally equivalent to the instructions in the original EDS 302 and compares (326) the output values to those stored in the main checkpoint 310. It may also store and subsequently read memory and register values to a shadow checkpoint identified by reference numeral 330 if these values are needed for the computation. These values will correspond to those that were not written to the main checkpoint either because they were later overwritten or not needed outside the main EDS, and the compiler would have eliminated these values as an optimization as mentioned before. If results out of comparison 326 do not match, an error handling routine is invoked (328).

An example of the compiler supported, soft error detection according to the present invention is now presented to illustrate the concepts described in the preceding paragraphs. Referring first to FIG. 4, a portion of source code (sometimes referred to as an application program) 400 is depicted. Source code 400, as depicted in FIG. 4, is represented by pseudo code that may or may not comply with any particular programming language formatting or construct restrictions. Source code 400 is suitable for adding a first 100-element vector (A[i]) to the product of a scalar constant (C) and a second 100-element vector (B[i]) and for computing a variable ("s") as the sum of the elements of the resulting vector (A[i]). The source code 400 then takes additional action (not germane to the invention) based on the value of "s."

Figure 5:
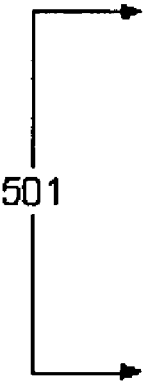
FIG. 5 is an exemplary original object code file corresponding to the source code file of FIG. 4.

Referring to FIG. 5, exemplary original assembler language code (original object code) 500 generated by a compiler 200 of the present invention is shown. Original object code 500 represents the "conventional" assembler language code produced by the compiler (i.e., the code produced prior to incorporating the soft error detection functionality). Original object code 500, as depicted in FIG. 5, also reflects processing by compiler 200 to identify the basic blocks of code 500. The basic blocks are demarcated in FIG. 5 by dashed lines with labels indicating each of the basic blocks (B0 through B8). Inspection of basic blocks B0 to B8 confirms that (1) the instructions within a basic block execute sequentially; (2) there is only one entry point into each basic block, namely, at the first instruction in the basic block; and (3) there is only one exit point from a basic block, namely, at the last instruction in the basic block. Note that we have taken liberty to include the call to subroutine "left" as part of basic block B7. This relaxed convention is permissible with the current invention unlike the more restrictive definition of basic blocks in prior art. This reflects a preferred embodiment of the invention but is not germane to the invention itself.

Figure 6:
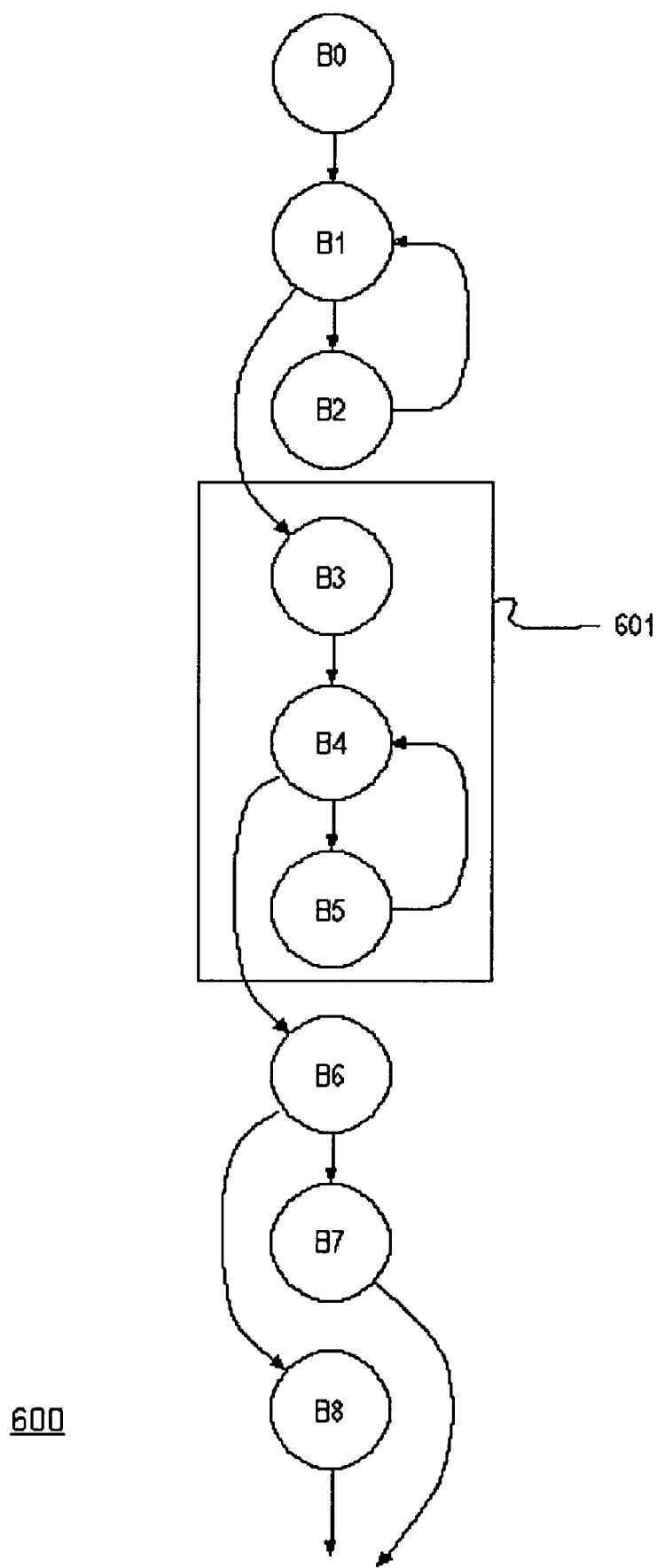
FIG. 6 is a conceptualized abstraction of the object code of FIG. 5 emphasizing the object code file as being comprised of a set of interconnected basic blocks.

Referring now to FIG. 6, the basic block structure of original object code 500 of FIG. 5 is presented in a simplified conceptual form 600 indicating each basic block as a "black box" and the possible control flow paths of original object code 500 as arrows connecting the basic blocks. By way of example, compiler 200 in the depicted illustration in addition to identifying the basic blocks, has identified a suitable EDS 601 that includes three basic blocks, namely basic blocks B3 through B5. The depicted EDS 601 thus illustrates that an EDS can include one or more basic blocks. The EDS 601 is a desirable candidate for purposes of the present invention because there is only one entry path into EDS 601. Having identified an EDS 601, compiler 200 as described above with respect to FIG. 2, will then modify the portion 501 of original object code 500 (FIG. 5) corresponding to EDS 601 by inserting instructions into EDS 601 for the purpose of saving the relevant register and memory state of EDS 601.

Referring to FIG. 7, an exemplary EDS 700 (referred to as the main EDS 700) illustrates code corresponding to EDS 601 of FIG. 6 after compiler 200 has modified the EDS to include instructions that store the relevant register/memory state of EDS 601 to a checkpoint such as the checkpoint 310 of FIG. 3. (The instructions inserted by compiler 200 to incorporate the error detection functionality are indicated in FIG. 7 with upper case op codes while the original and conventionally compiled instructions are indicated with lower case op codes).

The location of the checkpoint is stored (instruction 702) to the memory location CHKPNT_INDEX. Note that, in the depicted implementation, the checkpoint is referenced indirectly using the value stored in register r31 as an index. The manner in which the checkpoint is organized and accessed, however, is an implementation detail.

As indicated previously, compiler 200 is configured to inspect the instructions in an EDS to determine which registers are read by instructions in the EDS and which registers are modified by instructions in the EDS. Compiler 200 preferably modifies the original object code 500 by inserting into the EDS instructions that record the entry value of registers that are read within the EDS and instructions that record the exit value of registers that are modified (written) within the EDS. An entry value, as described above, refers to the value of a register or memory location when the control flow branches into the EDS while the exit value refers to the value of a register or memory location when the control flow branches out of the EDS.

With respect to original EDS code 501 of FIG. 5, for example, compiler 200 recognizes that three registers are read by instructions in original EDS code 501 and two registers are written by instructions in original EDS code 501. Specifically, registers r0 and r1 are both read (evaluated) by the cmp instruction at label L3 while the f1 register is read in the faddx instruction. Compiler 200 inserts an instruction (703) at the beginning of the EDS to store the entry value of r0 into the checkpoint. Compiler 200 does not, however, insert an instruction storing the entry value of r1. In the depicted implementation compiler 200 recognizes that r1 is cleared by the xor instruction in basic block B3. Since this instruction always executes within the program flow of main EDS 700, storing the entry value of r1 is unnecessary. Compiler 200 does, however, insert into main EDS 700 an instruction (704) recording the entry value of the f1 register because this register is read by the faddx instruction in basic block B5.

In addition to the input registers, the EDS reads the array "A" (in the index add instruction faddx). Therefore, it is necessary to store these values in the checkpoint, and thus instructions 709 and 710 are employed. These instructions effectively record the array "A" status in checkpoint so that its snapshot can be read subsequently during error detection. Note that two optimizations are possible here. First, the compiler may decide that the array's size may be too large, and therefore the memory requirements of the checkpoint may become excessive. In this case, the compiler may break the loop consisting of basic blocks B4 and B5 such that the EDS is made shorter, and such that the array can be stored in the checkpoint in a piecemeal fashion. In such situations, it is desirable to run the error detection as soon as possible to reclaim the space consumed by the checkpoint. Another optimization is for the compiler to determine if array "A" will be modified in the future or not. If it is not modified in the future, then an obvious optimization is to not to store the array in the checkpoint and read directly from its home location in the shadow EDS. These are optimizations that conform with control flow and data flow analysis in the traditional compiler lore, and they can apply just as well in this invention to reduce the memory storage requirements and processing overhead. Those skilled in the art may appreciate that many techniques for such analysis exist and that they may be applied to this invention to improve performance.

In addition to recognizing registers that are read by instructions in the EDS, compiler 200 also recognizes registers that are updated (written) by the EDS instructions. Main EDS 700 includes three instructions that modify the contents of a register, namely, the ldi instruction in basic block B3, the faddx instruction, and the addi instruction. Compiler 200 is configured to detect these three instructions and modify the original EDS code 501 by inserting instructions into main EDS 700 that record the exit values of the registers affected by these instructions. To ensure that the values recorded in the checkpoint are the exit values, (i.e., the values that exist when control flow exits the EDS) the values of these registers are preferably not recorded into the checkpoint until control flow exits main EDS 700. Referring back to FIG. 5 and FIG. 6, control flow exits EDS 601 in the ble instruction in basic block B4. Compiler 200 therefore preferably records the exit values of the relevant registers when the ble instruction produces a result that causes control flow to exit main EDS 700.

Referring now back to FIG. 7, main EDS 700 achieves the desired result by modifying the original ble instruction. Specifically, compiler 200 replaces the ble instruction with a bgt instruction (705) that produces a result that is logically opposite to the result of the original ble instruction. In addition, the branch target is modified so that the branch target of BGT instruction (705) is the basic block B5 (which was the non-branch target of the original ble instruction). The BGT instruction causes program flow to jump around the inserted instructions 706 and 707, which write the exit values of the f1, r1 and r2 registers, respectively, into the checkpoint. The resulting main EDS 700 thus includes a triple of instructions 706 and 707, 711, which store the exit values of registers f1, r1 and r2 into the checkpoint just before the program flow exits the EDS.

Each of the store instructions inserted into main EDS 700 by compiler 200 to record information into the checkpoint is shown as a "store with index" (STU) instruction. Using the STU instruction, the value of the source operand (r31) is incremented as part of the instruction execution. In this manner, the source operand points to the next available memory location of checkpoint 310.

As described above, compiler 200 is also responsible for generating a shadow EDS. The shadow EDS is preferably an independently executable thread. The shadow EDS verifies the results obtained by the main EDS by replicating the initial conditions (i.e., the entry state) of the main EDS and then by replicating the instructions that were executed by the main EDS. If the shadow EDS begins with a state that matches the initial state of the main EDS and executes instructions that are functionally equivalent to the instructions executed by the main EDS, the shadow EDS should produce results that are equal to results produced by the main EDS if there were no errors in either execution. The shadow EDS can then compare its results with results achieved by the main EDS to determine if an error occurred.

Referring now to FIG. 8, exemplary code for a shadow EDS 800 is illustrated. The instructions in shadow EDS 800 may be classified as one of two types of instructions, namely, shadowing instructions and verification instructions. Shadowing instructions, as implied by their name, are instructions that mirror (provide the functional equivalent of) the original object code instructions in the main EDS. The verification instructions are instructions incorporated into the shadow EDS to retrieve entry values from the main checkpoint and to compare the output values to values in the main checkpoint. In FIG. 8, verification instructions are illustrated with upper case op codes and shadow instructions are illustrated with lower case op codes.

Shadow EDS 800 includes verification instructions 803 through 805 that retrieve entry values from the main checkpoint so that the initial conditions present when the shadow instructions execute are the same as the conditions present when the main thread executed. The LD instruction 803 then loads the value of CHKPNT_INDEX into the r3 1 register. Shadow EDS 800 includes instructions 804 and 805 that retrieve values for the r0 and f1 registers from the main checkpoint. The retrieved values represent the entry values in the registers when the main EDS began to execute. In this manner, instructions 804 and 805 recreate the entry state of relevant registers (and possible memory locations) that the main EDS 700 experienced when it executed. Shadow EDS 800 also includes instruction 807 which reads the consecutive values of the array "A" from the checkpoint. This instruction 807 executes in a loop, and thus reads the values that were in array "A" from the checkpoint. This shows an important advantage of this method. That is, in a multithreaded application, no synchronization among threads is necessary. Furthermore, in this method we are not concerned about whether array "A" will be modified by some other threads between the execution of the main EDS and the shadow EDS. Instruction 808 mimics the effect of the indexing instruction on r2, by adding 8 bytes to account for the corresponding addition to r2 in the original code through the indexing instructions (8 bytes because this is a floating point datum).

After the instructions (803-805) responsible for recreating the entry state of the main EDS 700, shadow EDS 800 includes the mirror instructions (lower case op codes) in basic blocks B3 through B5. Comparison of the mirror instructions of shadow EDS 800 with the original assembler code in main EDS 700 reveals the two sets of instructions are functionally equivalent. Thus, execution of the shadow instructions in shadow EDS 800 (coupled with the recreation of the entry state) should produce the same results as the main EDS 700 produced when it executed.

Shadow EDS 800 determines whether it did in fact produce results that match results produced by main EDS 700. Specifically, shadow EDS 800 includes verification instructions 809 through 814 that read the output values stored by the main EDS and compare them with the values produced by the shadow EDS. Specifically, instructions 809 and 810 compare the value computed into register f1 by the shadow EDS to that stored in the checkpoint. The instruction CMPU compares a register to a location stored in main memory and advances the index (r31) by the size of the read variable. If the equality test fails, instruction 810 forces a jump to an error declaration and handling routine. Instructions 811-812 perform the same function to check register r1, and instruction 813-814 check register r2. If results in the main checkpoint differ from results in the shadow checkpoint, the depicted embodiment of shadow EDS 800 branches (instruction 810) to a portion of code entitled REPORT ERROR, that will inform a user or administrator that an error has been detected. The report error routine may also attempt to correct the errors. If shadow EDS 800 finds no differences between the shadow checkpoint and the main checkpoint, shadow EDS 800 has confirmed or validated the results produced by the main EDS and the shadow EDS terminates.

To handle errors, this method can be combined with traditional checkpoint/restart at the program level as done in the art, or perhaps through aborting the program as in transaction systems. The action upon error detection is orthogonal to this disclosure, and just about any plausible error recovery technique can be incorporated to work in this invention in a straightforward manner.

Shadow EDS 800 is preferably scheduled to execute by an operating system. The shadow EDS 800 can be launched by the operating immediately upon completion of the main EDS. Alternatively, shadow EDS 800 may be created when the application of which main thread 301 is a part is launched. In this implementation, shadow EDS 800 may then be scheduled to run at any time after the main checkpoint is committed.

It will be apparent to those skilled in the art having the benefit of this disclosure that the present invention discloses compiler software and methods for incorporating error detection functionality into object code. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A computer program product comprising computer executable instructions, stored on a computer readable medium, for compiling executable code enabled to detect errors in a data processing system, comprising:
   computer code for generating original assembler code from source code, wherein the original assembler code comprises a set of basic blocks;
   computer code for identifying a main error detection segment (EDS) in the original assembler code, wherein the main EDS encompasses one or more of the basic blocks, and wherein the main EDS has a single entry point and one or more exit points;
   computer code for identifying register and memory references in the main EDS; and
   computer code for modifying the original assembler code by inserting a set of state recording instructions in the main EDS, wherein the state recording instructions, when executed, record, in a main checkpoint, an entry state of the identified register and memory references including information indicative of register and memory values read by the main EDS as they exist when control flow enters the EDS at the entry point and an exit state of the identified register and memory references modified by the main EDS including their values and addresses as they exist when control flow exits the EDS at an exit point, and wherein the information recorded by the state recording instructions is utilized to detect soft errors in hardware of the data processing system.

2. The computer program product of claim 1, wherein the computer code for identifying register and memory references includes computer code for identifying a register reference or memory reference that is read by an instruction in the main EDS, and wherein the computer code for modifying the original assembler code includes computer code for inserting an instruction to store an entry value of a referenced register or a referenced memory location to the main checkpoint, wherein the entry value corresponds to a value in the referenced register or the referenced memory location when first read by the main EDS.

3. The computer program product of claim 1, wherein the computer code for identifying register and memory references includes computer code for identifying a register reference or memory reference that is modified by an instruction in the main EDS, and wherein the computer code for modifying the original assembler code includes computer code for inserting an instruction to store an exit value of a referenced register or a referenced memory location to the main checkpoint, wherein the exit value corresponds to a value in the referenced register or the referenced memory location upon exit from the main EDS.

4. The computer program product of claim 1, wherein the set of state recording instructions includes instructions for recording an entry value of a program counter and a stack pointer.

5. The computer program product of claim 1, wherein the main EDS has a single exit path.

6. The computer program product of claim 1, further comprising, computer code for generating a shadow EDS, wherein the shadow EDS includes mirroring instructions and verification instructions, wherein the mirroring instructions are functionally equivalent to the original assembler code in the main EDS, and wherein the verification instructions, when executed, compare results produced by the mirroring instructions with results stored in the main checkpoint.

7. The computer program product of claim 6, wherein the shadow EDS terminates responsive to verifying the results produced by the mirroring instructions correspond to the results stored in the main checkpoint, and wherein the shadow EDS initiates an error recovery process responsive to detecting a difference between the results produced by the mirroring instructions and the results stored in the main checkpoint.

8. The computer program product of claim 6, wherein the verification instructions include instructions to retrieve the entry state from the main checkpoint, and wherein an entry state of register and memory references for the shadow EDS mirrors the entry state of the register and memory references in the main EDS.

9. The computer program product of claim 6, wherein the main EDS is included in a first thread, and wherein the shadow EDS is included in a second thread.

10. A method for including error detection functionality in executable computer code, comprising:
  compiling original object code from a source code file;
  identifying a contiguous main error detection segment (EDS) of the original object code, wherein the main EDS comprises one or more basic blocks of the original object code, and wherein the main EDS has a single entry point and one or more exit points; and
  modifying the original object code by inserting an instruction to store, in a first checkpoint included in a system memory, an entry value of a register read by an instruction in the main EDS as it exists when control flow enters the EDS at the entry point and another instruction to store, in the first checkpoint, an exit value of a register written by another instruction in the main EDS as it exists when control flow exits the EDS at an exit point, and wherein the entry and exit values are utilized to detect soft errors in hardware of an associated data processing system.

11. The method of claim 10, further comprising generating verification code for inclusion in a shadow EDS, wherein the verification code includes an instruction to retrieve, from the first checkpoint, the entry state of the read register, instructions functionally equivalent to the instructions in the original object code of the main EDS, and another instruction to store, in a second checkpoint, an exit state of a register corresponding to the written register in the main EDS.

12. The method of claim 11, wherein the verification code further includes one or more instructions to compare results produced by the shadow EDS to results produced by the main EDS.

13. The method of claim 12, further comprising, responsive to executing the main EDS including the inserted instructions, executing the verification code.

14. The method of claim 13, wherein executing the main EDS comprises executing the main EDS as part of a first thread, and wherein executing the verification thread comprises executing the verification code as part of a second thread.

15. The method of claim 10, wherein the modifying the original object code further includes inserting instructions to store a state associated with memory locations referenced in the original object code.

16. A data processing system suitable for use as a compiler, the system including a system memory accessible to a processor, comprising:
  means for modifying an error detection segment (EDS) of original object code, comprising an assembler language equivalent of a source code file, to create modified object code including instructions to record values of selected registers and memory locations referenced by instructions in the original object code, the EDS comprising a collection of one or more basic blocks in the original object code and having a single entry point and one or more exit points;
  means for generating shadow object code including instructions equivalent in function to the instructions in a portion of the original object code, wherein the shadow object code, prior to executing, retrieves at least one of the values recorded by the modified original object code; and
  means for comparing the values of memory and register references written by the modified object code to corresponding values written by the shadow object code to detect soft errors in hardware of the data processing system;
  wherein the instructions to record values of selected registers and memory locations include:
    instructions to record initial values of selected registers and memory locations read by an instruction in the EDS as they exist when control flow enters the EDS at the entry point; and
    instructions to record final values of selected registers and memory locations written by instructions in the EDS as they exist when control flow exits the EDS at an exit point.

17. The system of claim 16, wherein the instructions to record values of selected registers and memory locations include instructions to record the values in a first checkpoint portion of the memory and wherein the shadow code includes instructions to record values in a shadow checkpoint.

18. The system of claim 16, wherein the means for generating the shadow object code includes:
  means for including instructions to retrieve the initial values from the first checkpoint to recreate an execution environment for the error detection segment; and
  means for including instructions to record final values produced by the shadow code in the shadow checkpoint, wherein the means for comparing comprises means for comparing the final values in the first checkpoint to the final values in the shadow checkpoint.

* * * * *